United States Patent
Lutjen (10) Patent No.: US 10,060,267 B2
(45) Date of Patent: Aug. 28, 2018

(54) GAS TURBINE ENGINE AIRFOIL COOLING PASSAGE TURBULATOR PEDESTAL

(71) Applicant: United Technologies Corporation, Hartford, CT (US)

(72) Inventor: Paul M. Lutjen, Kennebunkport, ME (US)

(73) Assignee: United Technologies Corporation, Farmington, CT (US)

( * ) Notice: Subject to any disclaimer, the term of this patent is extended or adjusted under 35 U.S.C. 154(b) by 269 days.

(21) Appl. No.: 14/787,287

(22) PCT Filed: Apr. 25, 2014

(86) PCT No.: PCT/US2014/035415
§ 371 (c)(1),
(2) Date: Oct. 27, 2015

(87) PCT Pub. No.: WO2014/186109
PCT Pub. Date: Nov. 20, 2014

(65) Prior Publication Data
US 2016/0069191 A1 Mar. 10, 2016

Related U.S. Application Data

(60) Provisional application No. 61/823,437, filed on May 15, 2013.

(51) Int. Cl.
*F01D 5/18* (2006.01)
(52) U.S. Cl.
CPC ............ *F01D 5/186* (2013.01); *F01D 5/187* (2013.01); *F05D 2230/21* (2013.01); *F05D 2240/304* (2013.01); *F05D 2260/2212* (2013.01); *F05D 2260/2214* (2013.01); *Y02T 50/673* (2013.01); *Y02T 50/676* (2013.01)

(58) Field of Classification Search
None
See application file for complete search history.

(56) References Cited

U.S. PATENT DOCUMENTS 4,407,632 A * 10/1983 Liang ............... F01D 5/187
415/115
5,601,399 A 2/1997 Okpara et al.
(Continued)

FOREIGN PATENT DOCUMENTS

| EP | 2378073 A1 | 10/2011 |
|---|---|---|
| WO | 2013180792 | 12/2013 |

OTHER PUBLICATIONS

International Search Report and Written Opinion fof PCT/U52014/035415 dated Aug. 22, 2014.
(Continued)

*Primary Examiner* — Igor Kershteyn
*Assistant Examiner* — Theodore Ribadeneyra
(74) *Attorney, Agent, or Firm* — Carlson, Gaskey & Olds, P.C.

(57) ABSTRACT

A gas turbine engine component includes a structure that provides a cooling passage. The structure has a turbulator with a pedestal joining opposing first and second surfaces. The turbulator includes first and second legs spaced apart from one another and adjoining the pedestal. The first leg adjoins the second surface, and the second leg adjoins the first surface.

15 Claims, 4 Drawing Sheets

(56) References Cited

U.S. PATENT DOCUMENTS

| | | | |
|---|---|---|---|
| 6,402,470 | B1 | 6/2002 | Kvasnak et al. |
| 7,544,044 | B1 | 6/2009 | Liang |
| 8,061,146 | B2 | 11/2011 | Joe et al. |
| 2002/0021966 | A1 | 2/2002 | Kvasnak et al. |
| 2006/0239819 | A1 | 10/2006 | Albert et al. |
| 2007/0172354 | A1* | 7/2007 | Annerfeldt .............. F01D 5/187 416/97 R |
| 2008/0063524 | A1* | 3/2008 | Tibbott ................... F01D 5/187 416/95 |
| 2009/0285684 | A1 | 11/2009 | Pinero et al. |

OTHER PUBLICATIONS

International Preliminary Report on Patentability for PCT Application No. PCT/US2014/035415 dated Nov. 6, 2015.
Supplementary European Search Report for European Application No. 14798339.9 dated Jan. 4, 2017.

\* cited by examiner

GAS TURBINE ENGINE AIRFOIL COOLING PASSAGE TURBULATOR PEDESTAL

BACKGROUND

This disclosure relates to a component for a gas turbine engine, such as an airfoil. More particularly, the disclosure relates to cooling passage turbulator pedestal for the gas turbine engine component.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Many blades and vanes, blade outer air seals, turbine platforms, and other components include internal cooling passages. As turbine inlet temperatures increase to prove engine thrust and cycle efficiency, advanced technologies are required to cool the trailing edge of turbine blades while minimizing the amount of cooling flow used. Some of the cooling passages may include portions having turbulence promoters that enhance the cooling effects of the cooling flow through the cooling passage. Use of refractory metal cores (RMC) to create high density patterns of cast cooling features, such as pedestals, has been shown to improve high convective heat transfer at low cooling flow requirements.

SUMMARY

In one exemplary embodiment, a gas turbine engine component includes a structure that provides a cooling passage. The structure has a turbulator with a pedestal joining opposing first and second surfaces. The turbulator includes first and second legs spaced apart from one another and adjoining the pedestal. The first leg adjoins the second surface, and the second leg adjoins the first surface.

In a further embodiment of any of the above, the structure includes first and second rows of pedestals. The first row of pedestals includes the turbulator. The second row of pedestals is arranged downstream from the first row of pedestals.

In a further embodiment of any of the above, the turbulator is interleaved with the second row of pedestals.

In a further embodiment of any of the above, the first and second legs respectively include first and second tips that are arranged downstream from the second row of pedestals.

In a further embodiment of any of the above, a third row of pedestals are arranged downstream from the second row of pedestals. The first and second tips are arranged upstream from the third row of pedestals.

In a further embodiment of any of the above, the first and second legs are arranged upstream from the second row of pedestals.

In a further embodiment of any of the above, at least one of the first and second legs is airfoil-shaped.

In a further embodiment of any of the above, at least one of the first and second legs is triangular-shaped.

In a further embodiment of any of the above, the structure is an airfoil. The pedestal extends in a thickness direction between the first and second surfaces.

In a further embodiment of any of the above, the first and second legs extend in a chordwise direction.

In a further embodiment of any of the above, the turbulator is arranged in a trailing edge cooling passage.

In a further embodiment of any of the above, the first and second legs overlap in a radial direction.

In a further embodiment of any of the above, the first and second legs are spaced apart from one another in a non-overlapping relationship in the radial direction.

In a further embodiment of any of the above, the structure is one of a blade, vane, platform, blade outer air seal or combustor liner.

In one exemplary embodiment, an airfoil for a gas turbine engine includes an airfoil structure that provides a cooling passage. The airfoil structure has a turbulator with a pedestal joining opposing first and second surfaces. The turbulator includes first and second legs spaced apart from one another and adjoining the pedestal. The first leg adjoins the second surface. The second leg adjoins the first surface. The pedestal extends in a thickness direction between the first and second surfaces. The first and second legs extend in a chordwise direction.

In a further embodiment of any of the above, the structure includes a first, second and third rows of pedestals. The first row of pedestals includes the turbulator. The second row of pedestals are arranged downstream from the first row of pedestals. The third row of pedestals are arranged downstream from the second row of pedestals. The turbulator is interleaved with the second row of pedestals. The first and second legs respectively include first and second tips that are arranged downstream from the second row of pedestals. The first and second tips arranged upstream from the third row of pedestals.

In a further embodiment of any of the above, the structure includes first and second rows of pedestals. The first row of pedestals includes the turbulator. The second row of pedestals is arranged downstream from the first row of pedestals. The first and second legs are arranged upstream from the second row of pedestals.

In a further embodiment of any of the above, the airfoil is a turbine blade. The turbulator is arranged in a trailing edge cooling passage.

In a further embodiment of any of the above, the first and second legs overlap in a radial direction.

In a further embodiment of any of the above, the first and second legs are spaced apart from one another in a non-overlapping relationship in the radial direction.

In one exemplary embodiment, a core for a producing a gas turbine engine component includes a core structure that is configured to provide a cooling passage. The core structure has an aperture corresponding to the shape of a turbulator. The core structure has a pedestal joining opposing first and second surfaces corresponding to opposing surfaces of the core structure. The aperture provides a turbulator shape that is configured to provide first and second legs spaced apart from one another and adjoining the pedestal. The first leg adjoins the second surface, and the second leg adjoins the first surface.

BRIEF DESCRIPTION OF THE DRAWINGS

The disclosure can be further understood by reference to the following detailed description when considered in connection with the accompanying drawings wherein.

DETAILED DESCRIPTION

Figure 1:
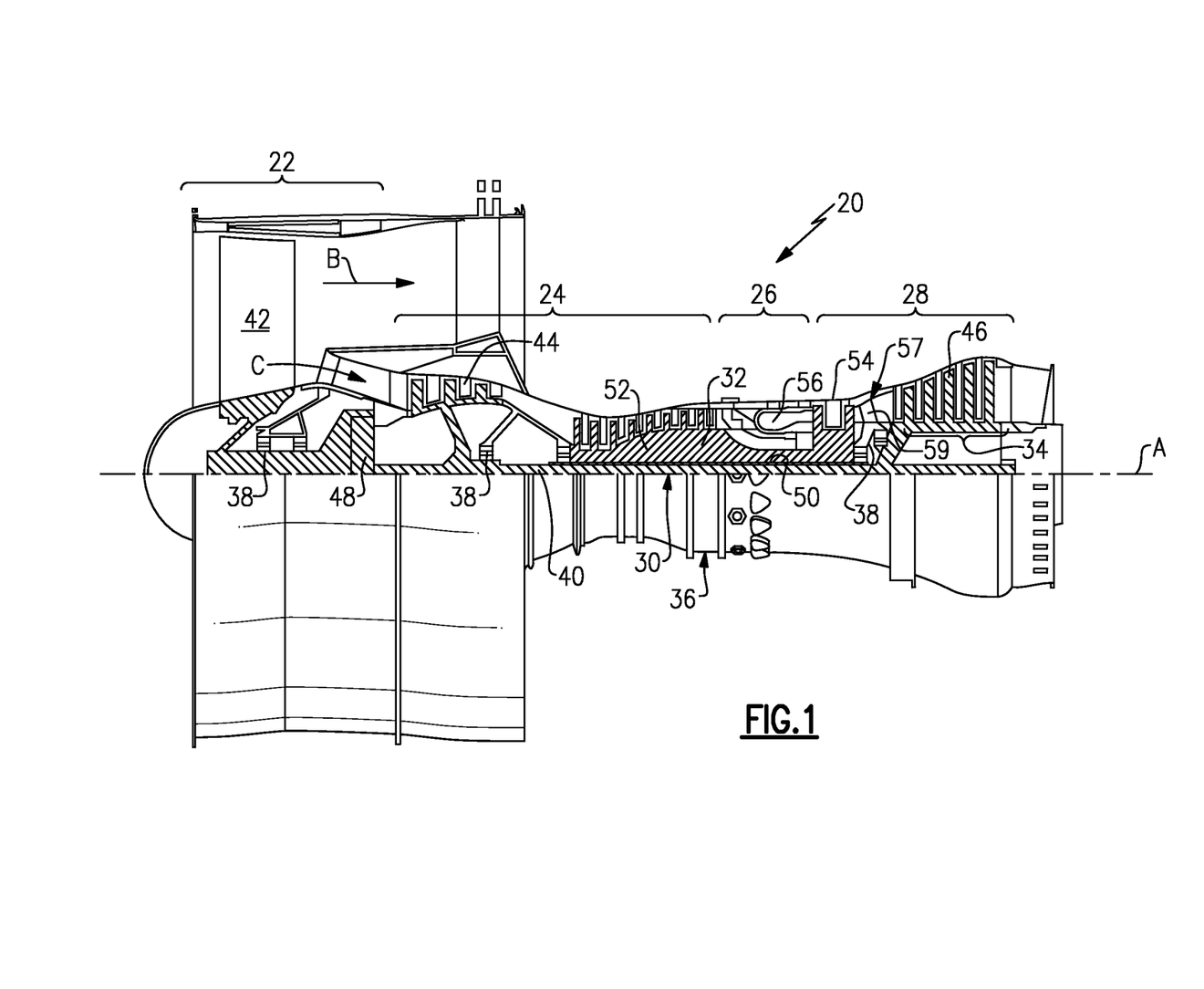
FIG. 1 is a schematic view of an example gas turbine engine incorporating the disclosed airfoil.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV")

system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

Figure 2A:
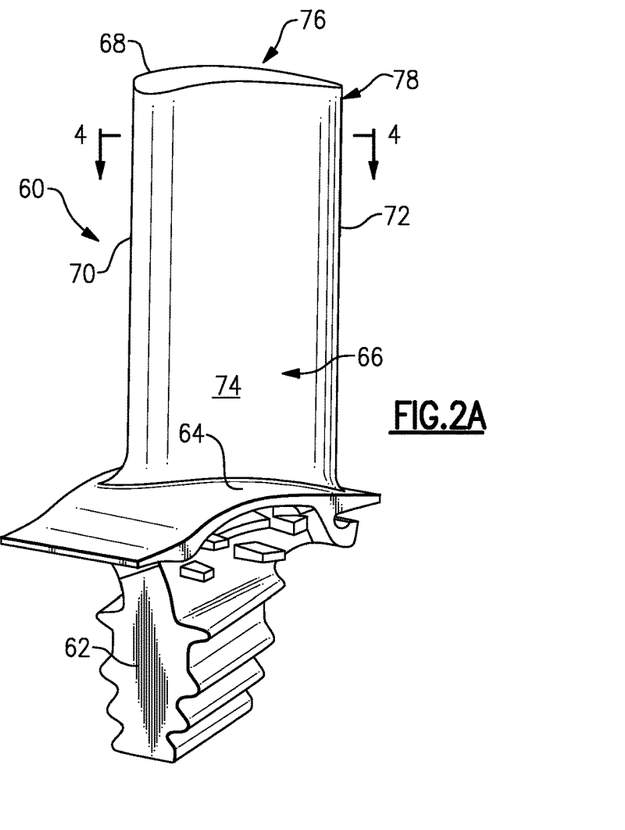
FIG. 2A is a perspective view of the airfoil having the disclosed cooling passage.

An example blade 60 is shown in FIG. 2A. The blade 60 includes a platform 64 supported by a root 62, which is secured to a rotor, for example. An airfoil 66 extends radially outwardly from the platform 64 opposite the root 62 to a tip 68. While the airfoil 66 is disclosed as being part of a turbine blade 60, it should be understood that the disclosed airfoil may also be used as a vane. Moreover, the disclosed turbulence promoting structure may be used in other gas turbine engine components, such as combustors and exhaust liners, platform, blade outer air seals and/or vanes, for example.

Figure 2B:
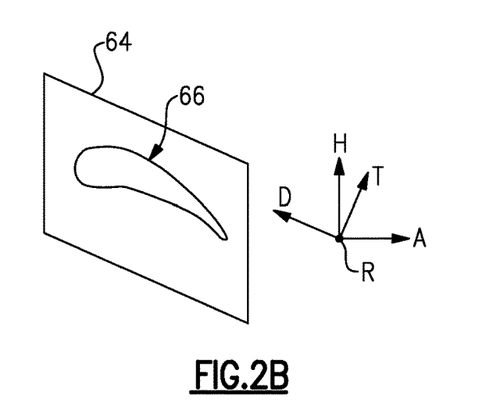
FIG. 2B is an end view of the airfoil illustrating directional references.

Also referring to FIG. 2B, the airfoil 66 includes an exterior airfoil surface 78 extending in a chord-wise direction D from a leading edge 70 to a trailing edge 72. The airfoil 66 is provided between pressure and suction sides 74, 76 in an airfoil thickness direction T, which is generally perpendicular to the chord-wise direction D. Multiple airfoils 66 are arranged circumferentially in a circumferential direction H. The airfoil 66 extends from the platform 64 in a radial direction R to the tip 68. The exterior airfoil surface 78 may include multiple film cooling holes.

Figure 3:
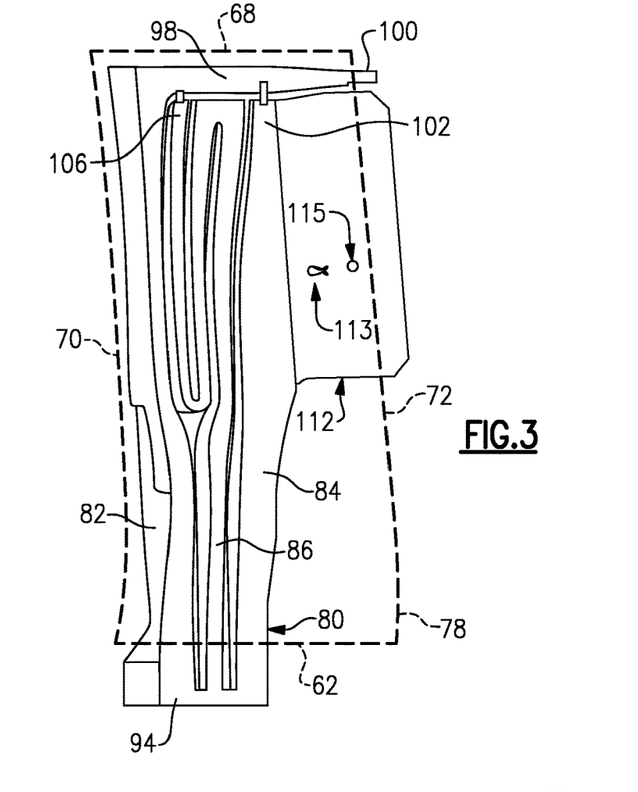
FIG. 3 is a perspective view of an example core providing cooling passages, with an exterior airfoil surface shown in phantom.

An example core for making the airfoil 66 is illustrated in FIG. 3. The core may be a single, unitary core or include multiple core portions secured to one another. The shapes of the core portions correspond to shapes of internal cooling passages of the airfoil 66. Greater or fewer cooling passages may be provided than in the example shown. In the example shown, the core is provided by a first core 80 constructed from ceramic and a second core 112 constructed from a refractory metal.

The first core 80 includes first, second and third core portions 82, 84, 86, which all extend generally in the radial direction. An inlet core portion 94 interconnects the first, second and third core portions 82, 84, 86 at the root 62. In the example, the first core portion 82 is located near the leading edge 70 of the airfoil 66. The first core portion 82 extends in the chord-wise direction to provide a tip flag portion 98 adjacent to the tip 68. The tip flag portion 98 terminates in a first end 100 that is configured to extend beyond the trailing edge 72 of the airfoil 66 for casting purposes. The second core portion 84 terminates in a second end 102 adjacent to and radially beneath the tip flag portion 98.

In the example, the first and second core portions 82, 84 provide a single radial run. The third core portion 86 is arranged between the first and second core portions 82, 84 in the chord-wise direction. The third core portion 86 has a serpentine shape providing multiple radial runs and terminates in a third end 106 near the tip flag portion 98.

Figure 4:
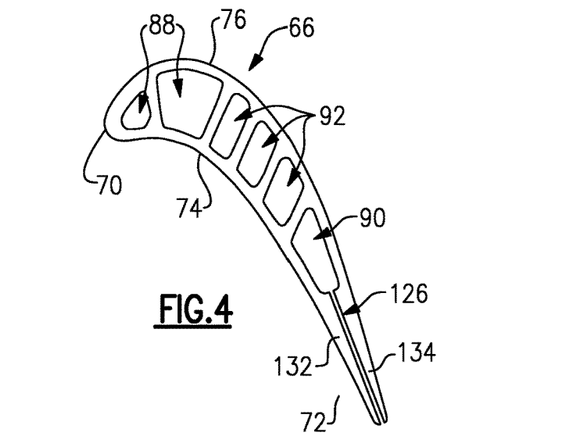
FIG. 4 is a cross-sectional view through the airfoil taken along line 4-4 in FIG. 2A.

Referring to FIG. 4, the airfoil 66 includes first, second and third cooling passages 88, 90, 92 that respectively correspond to the shape of the first, second and third core portions 82, 84, 86. A trailing edge cooling passage 126 is provided between opposing pressure and suction side walls 132, 134 in the airfoil 66. The trailing edge cooling passage 126 corresponds to the shape of the trailing edge core portion 112.

Depending on the gas flow path temperature of the application, apertures may be provided in the trailing edge core portion 112 (not shown) to produce correspondingly shaped pedestals that interconnect the pressure and suction side walls 132, 134, providing desired cooling characteristics along the trailing edge of the airfoil 66. The trailing edge core portion 112 may include repeating hole patterns, which produce rows of pedestals. The trailing edge core portion may be constructed from a refractory metal and is relatively flat from the inner platform to the tip with very little aerodynamic twist.

Figure 5A:
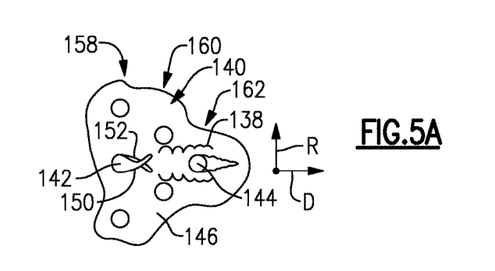
FIG. 5A is a cross-sectional view through an example cooling passage having pedestals.
Figure 5B:
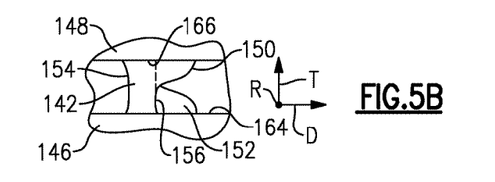
FIG. 5B is a view of one of the pedestals shown in FIG. 5A taken in a thickness direction.

An arrangement of pedestals within a cooling passage 140 (such as the trailing edge cooling passage 126) is shown in FIGS. 5A and 5B. The arrangement includes upstream and downstream pedestals 142, 144 arranged in first, second and third rows 158, 160, 162. Although three rows of pedestals are shown, more or fewer rows may be utilized within the cooling passage 140. The pedestals extend in the thickness direction T between and adjoin first and second spaced apart walls 146, 148, which define the cooling passage 140. In the case of an airfoil, the first and second walls may correspond to the pressure and suction side walls 132, 134.

The pedestal 142 includes first and second legs 150, 152 that extend from the downstream side 156, opposite the upstream side 154 of the pedestal 142 to form a turbulator that enhances mixing of the cooling fluid flowing through the cooling passage 140. In the example, the first and second legs 150, 152 create turbulence 138 that flows about the downstream pedestal 144 to induce additional mixing that would not otherwise occur without the legs. In the example, the fluid flow direction corresponds to the chordwise direction D.

Referring to FIG. 5B, the first and second legs 150, 152 do not extend the full width provided between the first and second walls 146, 148. In the example, the first leg 150 extends from the downstream side 156 to a second surface 166 provided by the second wall 148. The second leg 152 extends from the downstream side 156 to a first surface 164 of the first wall 146. In this manner, the first and second legs 150, 152 does not entirely obstruct the flow of fluid past the legs, but rather require the cooling fluid to flow through the legs, which induces additional mixing.

The second core 112 may be provided by a refractory metal blank that is machined to include apertures 113 (only one shown for clarity) that provide shapes corresponding to the turbulators (e.g., FIGS. 5A and 5B) and other apertures 115 (only one shown for clarity) that provide, for example, a conventional pedestal shape, as shown in FIG. 3. In one example, a core for a producing a gas turbine engine component includes a core structure, or second core 112, configured to provide the cooling passage 140. The aperture 113 corresponds to a shape of a turbulator, and the first and second surfaces 164, 166 correspond to opposing surfaces of the core structure. The turbulator shape is configured to provide first and second legs 150,152 spaced apart from one another and adjoining the pedestal 142. The second core 112 also may be formed by an additive manufacturing process, or the airfoil 66 may be formed additively to provide the turbulators.

Figure 6A:
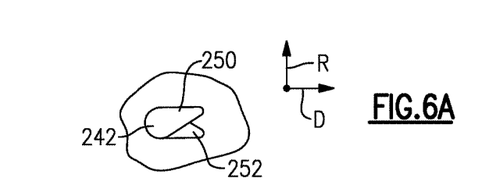
FIGS. 6A and 6B are cross-sectional views of other example pedestals.
Figure 6B:
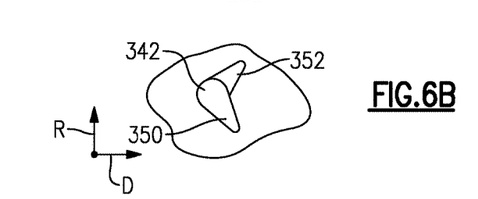

The pedestal and legs may provide any suitable shape. In the example shown in FIG. 5A, the legs 150, 152 are generally airfoil-shaped. In the example shown in FIGS. 6A and 6B, the legs are generally triangular-shaped. Moreover, the legs may be spaced any suitable distance from one another at a desired angle. In the example shown in FIG. 6A, the pedestal 242 includes first and second legs 250, 252 that are relatively closely spaced to one another. The outer surfaces of the first and second legs 250, 252 are generally parallel to one another and the flow direction, which induces less mixing. In the example shown in FIG. 6B, the pedestal 342 includes first and second legs 350, 352 that are separated more substantially from one another, which induces a greater amount of mixing.

Figure 7:
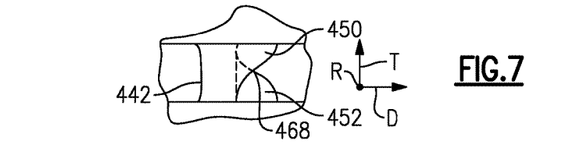
FIG. 7 is an example view of another pedestal in the thickness direction.

In a similar manner, the legs may be spaced from the walls in varying manners to affect the mixing. In the example shown in FIG. 5B, the first and second legs 150, 152 extend from the downstream side 156 of the pedestal 142 at approximately the midpoint in the thickness direction T. In the example shown in FIG. 7, the first and second legs 450, 452 may extend from the pedestal 442 along a greater length, such that the first and second legs 450, 452 overlap one another at a point 468 relative to the thickness direction T.

Figure 8A:
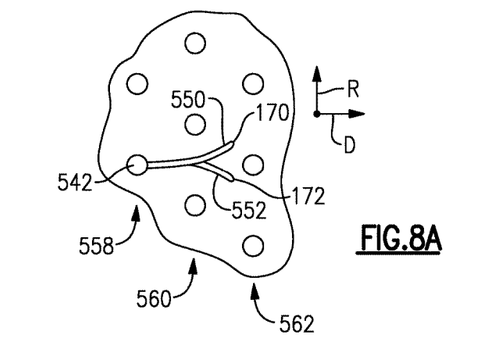
FIG. 8A is a cross-sectional view of a pedestal with legs interleaved with another row of pedestals.
Figure 8B:
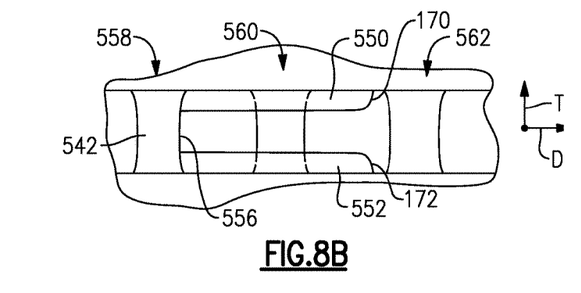
FIG. 8B is a view of the pedestal arrangement shown in FIG. 8A in the thickness direction.

Another example pedestal arrangement is shown in FIGS. 8A and 8B. The pedestal 542 includes first and second legs 550, 552 that extend a substantial distance from the downstream side 556 of the pedestal 542 (in first row 558) such that the first and second legs 550, 552 are interleaved with the second row 560. The first and second legs 550, 552 each respectively include a tip 170, 172. In the example, the first and second tips 170, 172 are provided between the second and third rows 560, 562.

Although example embodiments have been disclosed, a worker of ordinary skill in this art would recognize that certain modifications would come within the scope of the claims. For that reason, the following claims should be studied to determine their true scope and content.

What is claimed is:

1. A gas turbine engine component comprising:
a structure providing a cooling passage having a turbulator with a pedestal joining opposing first and second surfaces, the turbulator including first and second legs spaced apart from one another in a thickness direction and adjoining the pedestal, the first leg adjoining the second surface, and the second leg adjoining the first surface, and the pedestal extends in the thickness direction between the first and second surfaces, and the first and second legs do not fully extend between the first and second surfaces in the thickness direction, at least one of the first and second legs extend to a terminal end toward another pedestal, wherein the terminal end is disconnected from the other pedestal, wherein the structure includes first and second rows of pedestals, the first row of pedestals including the turbulator, wherein the turbulator is interleaved with the second row of pedestals, and the second row of pedestals arranged downstream from the first row of pedestals, wherein the first and second legs each include terminal ends that respectively provide first and second tips arranged downstream from the second row of pedestals.

2. The gas turbine engine component according to claim 1, comprising a third row of pedestals arranged downstream from the second row of pedestals, the first and second tips arranged upstream from the third row of pedestals.

3. The gas turbine engine component according to claim 1, wherein at least one of the first and second legs are airfoil-shaped.

4. The gas turbine engine component according to claim 1, wherein at least one of the first and second legs are triangular-shaped.

5. The gas turbine engine component according to claim 1, wherein the structure is an airfoil.

6. The gas turbine engine component according to claim 5, wherein the first and second legs extend in a chordwise direction.

7. The gas turbine engine component according to claim 6, wherein the turbulator is arranged in a trailing edge cooling passage.

8. The gas turbine engine component according to claim 1, wherein first and second legs overlap in a radial direction.

9. The gas turbine engine component according to claim 1, wherein the first and second legs are spaced apart from one another in a non-overlapping relationship in the radial direction.

10. The gas turbine engine component according to claim 1, wherein the structure is one of a blade, vane, platform, blade outer air seal or combustor liner.

11. An airfoil for a gas turbine engine comprising:
an airfoil structure providing a cooling passage having a turbulator with a pedestal joining opposing first and second surfaces, the turbulator including first and second legs spaced apart from one another in a thickness direction and adjoining the pedestal, the first leg adjoining the second surface, the second leg adjoining the first surface, the pedestal extends in the thickness direction between the first and second surfaces, and the first and second legs extend in a chordwise direction, and the first and second legs do not fully extend between the first and second surfaces in the thickness direction, at least one of the first and second legs extend to a terminal end toward another pedestal, wherein the terminal end is disconnected from the other pedestal, wherein the structure includes first, second and third rows of pedestals, the first row of pedestals including the turbulator, and the second row of pedestals arranged downstream from the first row of pedestals, and the third row of pedestals arranged downstream from the second row of pedestals, the turbulator is interleaved with the second row of pedestals, the first and second legs each include terminal ends that respectively provide first and second tips arranged downstream from the second row of pedestals, the first and second tips arranged upstream from the third row of pedestals.

12. The airfoil according to claim 11, wherein the airfoil is a turbine blade, and the turbulator is arranged in a trailing edge cooling passage.

13. The airfoil according to claim 11, wherein first and second legs overlap in a radial direction.

14. The airfoil according to claim 11, wherein the first and second legs are spaced apart from one another in a non-overlapping relationship in the radial direction.

15. A core for a producing a gas turbine engine component, comprising:
a core structure configured to provide a cooling passage, the core structure having an aperture corresponding to shape of a turbulator with a pedestal joining opposing first and second surfaces corresponding to opposing surfaces of the core structure, the aperture providing a turbulator shape configured to provide first and second legs spaced apart from one another in a thickness direction and adjoining the pedestal, the first leg adjoining the second surface, and the second leg adjoining the first surface, and the pedestal configured to extend in the thickness direction between the first and second surfaces, and the first and second legs do not fully extend between the first and second surfaces in the thickness direction, at least one of the first and second legs configured to extend to a terminal end toward another pedestal, wherein the terminal end is disconnected from the other pedestal, wherein the core structure configured to provide first and second rows of pedestals, the first row of pedestals including the turbulator, wherein the turbulator is interleaved with the second row of pedestals, and the second row of pedestals arranged downstream from the first row of pedestals, wherein the first and second legs configured to each include terminal ends that respectively provide first and second tips arranged downstream from the second row of pedestals.

* * * * *